United States Patent [19]
Miyakawa

[11] Patent Number: 5,966,118
[45] Date of Patent: Oct. 12, 1999

[54] ERGONOMIC COMPUTER MOUSE

[76] Inventor: Masae Miyakawa, 3-48, Wakamatsu-machi, Nonoichi-machi, Ishikawa-gun, Ishikawa-ken, Japan

[21] Appl. No.: 08/890,525

[22] Filed: Jul. 9, 1997

[30] Foreign Application Priority Data

Oct. 24, 1996 [JP] Japan .................................. 8-299590

[51] Int. Cl.[6] .................................................. G06F 3/033
[52] U.S. Cl. ........................................................... 345/163
[58] Field of Search ......................... 345/163; 341/20–22

[56] References Cited

U.S. PATENT DOCUMENTS 4,862,165  8/1989  Gart ............................................. 341/20
5,570,112  10/1996  Robinson ................................. 345/163

Primary Examiner—Mark R. Powell
Attorney, Agent, or Firm—Flynn, Thiel, Boutell & Tanis, P.C.

[57] ABSTRACT

A computer mouse capable of stimulating therapeutic points of the human body to reduce user fatigue. Projection bodies for stimulating the therapeutic points are provided on the main body and click buttons of the computer mouse.

8 Claims, 2 Drawing Sheets

ERGONOMIC COMPUTER MOUSE

FIELD OF THE INVENTION

This invention relates to a healthier computer mouse, more specifically, an ergonomically-improved computer mouse which can stimulate therapeutic points in the palm of the hand to relieve user fatigue.

BACKGROUND OF THE INVENTION

In a personal computer, a computer mouse is moved on a surface body to input positioning of a cursor on a computer screen and is frequently used to facilitate the input and selection options.

However, the long-time use of a personal computer causes user fatigue, for example eyestrain or stiffness in the shoulders in the human body. When the personal computer is operated by the use of the mouse, movement of the mouse in various directions is needed, which makes user fatigue quite remarkable and a significant problem.

In order to eliminate the above disadvantages, the present invention has as an object to provide a mouse having a main body and a click button including projection bodies on the main body and the click button for stimulating therapeutic points on the user's hand.

According to this invention, the fatigue can be diminished and possibly banished since the therapeutic points in the palm of the hand are stimulated by the projection bodies when the palm is put on the upper surface of the mouse. Thusly, the ergonomics of the mouse are improved.

DETAILED DESCRIPTION

Figure 1:
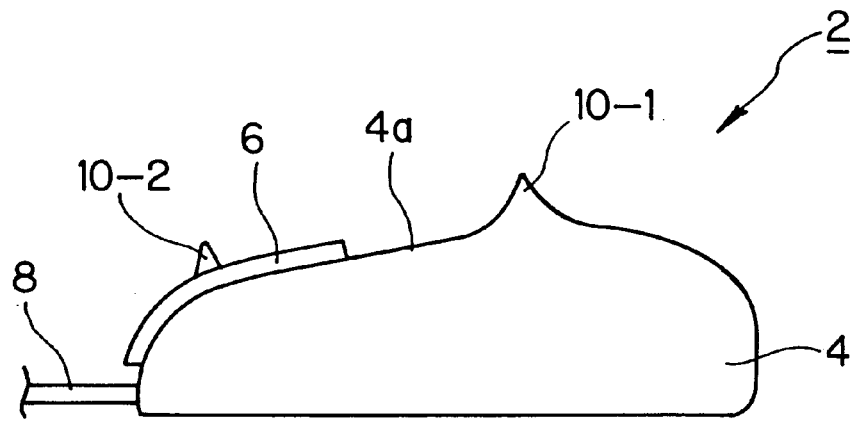
FIG. 1 is a side view of a mouse according to this invention.
Figure 2:
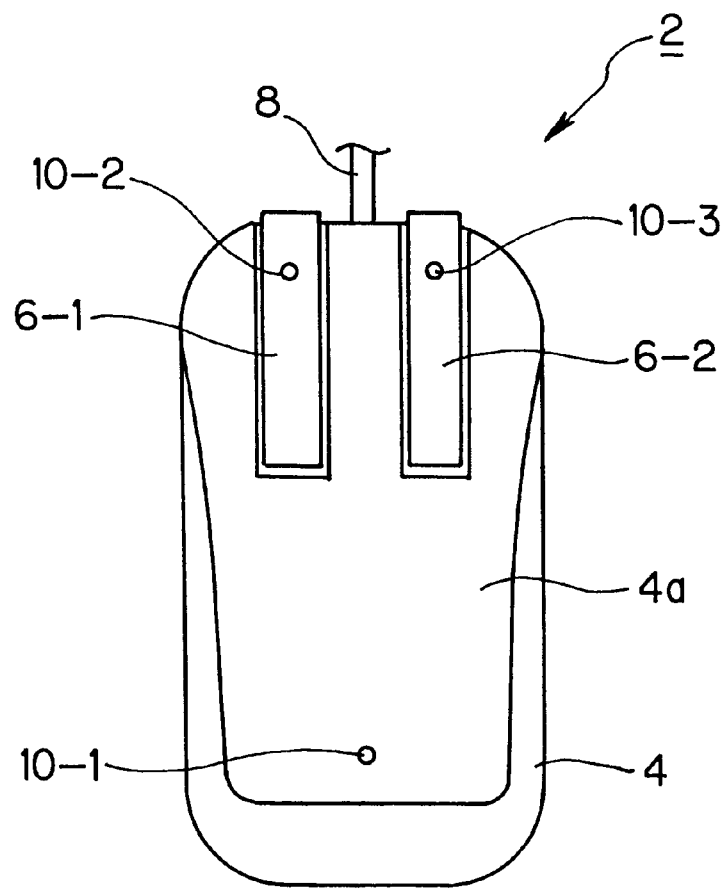
FIG. 2 is a plan view of the mouse according to this invention.

A preferred embodiment of this invention will now be specifically described in detail hereinafter in reference to the drawings. FIGS. 1 to 6 illustrate the embodiment of this invention. In FIGS. 1, 2, denoted at 2 is a mouse used in a personal computer (not shown). This mouse 2 has a main body 4 and left and right click buttons 6-1, 6-2. An electrical communication cord 8 is connected to the main body 4 for communicating the mouse with the computer.

Figure 3:
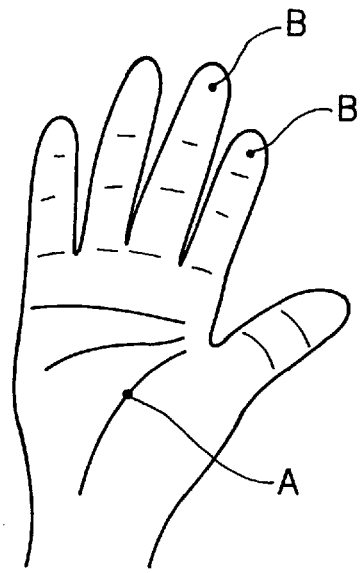
FIG. 3 is a view illustrating the therapeutic points of the hand.

A main body-side projection body 10-1 protrudes from an upper surface 4a of the main body 4 and it is positioned in substantially the center part of the palm when the hand is placed onto the mouse 2 to operate the mouse. The main body-side projection body 10-1 stimulates the therapeutic point Rokyu A located substantially in the center part of the palm, as shown in FIG. 3, to relieve eyestrain or languor.

Left and right button projection bodies 10-2, 10-3 protrude upwardly from the upper surfaces of the left and right click buttons 6-1, 6-2, respectively. The left and right button projection bodies 10-2, 10-3 stimulate each of the therapeutic points Jusens B of the forefinger and middle finger of the hand using the left and right click buttons 6-1, 6-2, which, for example, reduce blood pressure.

Figure 4:
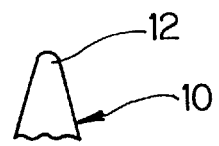
FIG. 4 is a view showing a preferred form of a projection body according to this invention.
Figure 5:
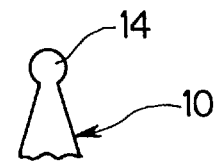
FIG. 5 is a view showing another embodiment of the form of the projection body.
Figure 6:
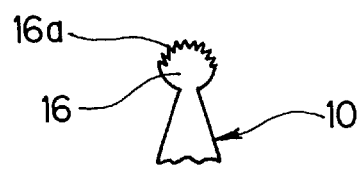
FIG. 6 is a view showing a further embodiment of the form of the projection body.

The projection body 10 preferably has one of the forms shown in FIGS. 4–6 as examples. That is, a protruding end portion 12 which sharply protrudes upwardly, as shown in FIG. 4, is formed on the projection body 10. The projection body 10 has a triangular cross section and essentially a cone shape. The end portion 12 has a rounded uppermost end to comfortably contact a user's hand.

Otherwise, a spherical ball portion 14, as shown in FIG. 5, is formed on the upper tip end of the projection body 10.

Further, a spherical ball portion 16, as shown in FIG. 6, is formed on the upper tip of the projection body 10, which has a fine rugged surface 16a formed on the surface of the ball portion 16.

The operation of this preferred embodiment will be described hereinafter.

In the use of the personal computer, when the palm of the hand is put on the upper surface of the mouse to hold the mouse, the Rokyu therapeutic point A in substantially the center part of the palm contacts the main body-side projection 10-1, while the Jusens therapeutic points B of the forefinger and the middle finger also contact the left button projection body 10-2 and the right button projection body 10-3, respectively.

When the mouse is operated in various directions, the main body-side projection 10-1 stimulates the Rokyu A therapeutic point, and the left and right button projection bodies 10-2, 10-3 also stimulate the Jusens B therapeutic points of the forefinger and the middle finger, respectively. Thus, by only operating the mouse 2, eyestrain, shoulder stiffness, or languor can be naturally relieved, or blood pressure can be reduced, to relieve or possibly banish the user's fatigue.

According to the form of the projection body 10 in FIG. 4, the therapeutic points can be strongly and precisely stimulated by the protruding end portion 12 to reduce or banish fatigue. Further, according to the form of the projection body 10 in FIG. 5, the therapeutic points can be more widely stimulated by the ball portion 14 than the FIG. 4 form of the end portion 12. Still further, according to the form of the projection body 10 in FIG. 6, the therapeutic points can be widely stimulated by the ball-shaped end portion 16, and also effectively stimulated by the rugged or jagged surface 16a to actively reduce and possibly banish fatigue in the user. The jagged surface 16a has multiple peaks and valleys along the peripheral surface of the end portion 16. Thus the projection bodies 10 may be selected according to the desired therapeutic effect on each of the therapeutic points.

Three projection bodies 10 are provided in the mouse 2 in the above embodiment, but three or more projection bodies 10 can be optionally provided in prescribed therapeutic positions.

The therapeutic points of the hand can be directly stimulated by the use of the projection bodies 10 of the mouse 2 even when the mouse 2 is not operated with the personal computer.

As is apparent from the above detailed description, according to this invention, projection bodies for stimulating the therapeutic points are provided on the main body and click button(s) of a mouse, whereby the therapeutic points can be stimulated by the projection bodies of the mouse to reduce or possibly banish fatigue from the human body.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A computer mouse comprising a main body defining a generally upwardly facing surface portion on which a user's hand is positionable and a downwardly facing generally flat surface part for positioning on a work surface, and a button member mounted on said main body and defining an outwardly facing surface portion selectively actuable by a user to transmit a signal to a computer in communication with said mouse, at least one of said main body and said button member including a projection extending outwardly from said surface portion thereof for physical contact with the hand of the user, a base of said projection occupying a minor part of the surface area of said one surface portion.

2. The computer mouse according to claim 1, wherein said projection is generally conical in shape and has a rounded terminal end portion opposite said base thereof.

3. The computer mouse according to claim 1, wherein a terminal end portion of said projection opposite said base thereof is spherical in shape.

4. The computer mouse according to claim 3, wherein said terminal end portion has a jagged surface to improve frictional contact with a hand of a user.

5. The computer mouse according to claim 1 wherein both said main body and said button member include a projection extending outwardly from said surface portion thereof for physical contact with a palm and a fingertip of the user's hand, respectively.

6. The computer mouse according to claim 5 wherein said main body projection physically contacts a central part of the palm of the user's hand during operation of said mouse.

7. The computer mouse according to claim 6 wherein said button member projection physically contacts the underside of the fingertip of one of the user's index finger or middle finger during operation of said mouse.

8. The computer mouse according to claim 6 wherein said button member is a first button member and said mouse further includes a second button member adjacent said first button member and having an outwardly facing surface portion which is selectively actuable by the user to transmit a signal to the computer, said second button member including a projection extending outwardly from said surface portion thereof physically contacting the underside of a fingertip of the user's middle finger during operation of said mouse, said projection of said first button member physically contacting the underside of a fingertip of the user's index finger during use of said mouse.

\* \* \* \* \*